(No Model.)
E. RUTZLER.
PIPE HANGER.
No. 431,010. Patented June 24, 1890.
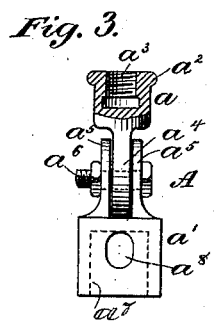
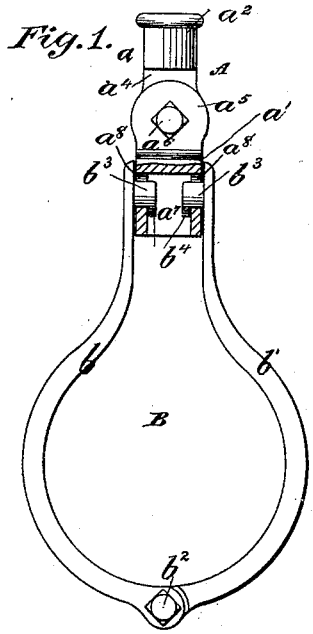
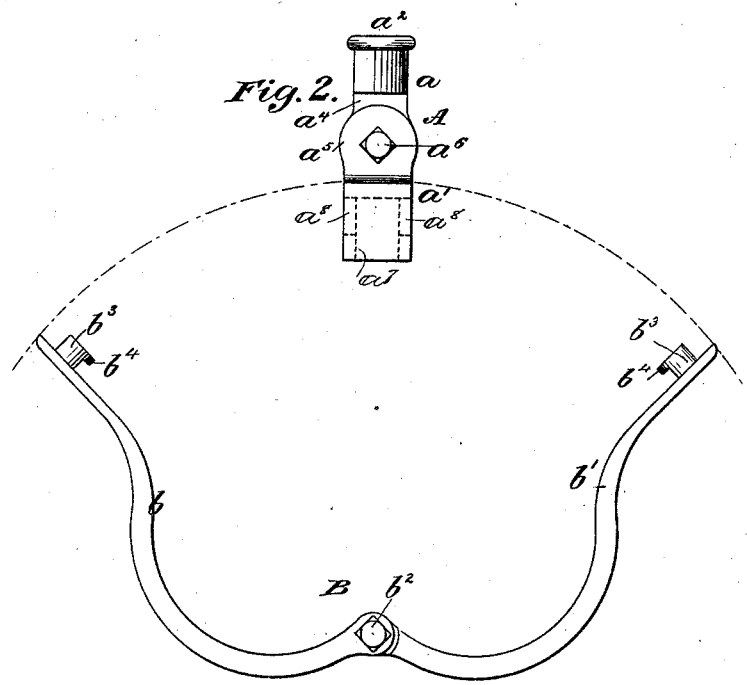
Witnesses:
Inventor:
Enoch Rutzler
by his attorneys
Brown Griswold

UNITED STATES PATENT OFFICE.

ENOCH RUTZLER, OF BROOKLYN, NEW YORK.

PIPE-HANGER.

SPECIFICATION forming part of Letters Patent No. 431,010, dated June 24, 1890.

Application filed January 30, 1890. Serial No. 338,625. (No model.)

*To all whom it may concern:*

Be it known that I, ENOCH RUTZLER, of Brooklyn, in the county of Kings and State of New York, have invented a certain new and useful Improvement in Pipe-Hangers, of which the following is a specification.

I will describe a pipe-hanger embodying my improvement in detail, and then point out the novel features in the claim.

In the accompanying drawings, Figure 1 is a side elevation, partly in section, of a pipe-hanger embodying my improvement. Fig. 2 is a similar view showing the members disconnected from each other. Fig. 3 is a side elevation, also partly in section, of one of the members, looking in a direction at right angles to that shown in Figs. 1 and 2. Fig. 4 is a side elevation showing a modified form of the member shown in Fig. 3.

Similar letters of reference designate corresponding parts in all the figures.

A pipe-hanger made in accordance with my improvement comprises two members A B. The member A, in the example of my improvement shown in Figs. 1, 2, and 3, is composed of two parts $a$ $a'$. The part $a$ has in this instance a head portion $a^2$, provided with an internally screw-threaded socket $a^3$, formed in its upper end portion. In this socket may be secured a screw or bolt, by which the hanger may be attached to a suitable support. Below the head portion $a^2$ is a shank $a^4$, which shank is shown as flattened. This shank is provided about centrally with a transversely-extending aperture. The part $a'$ is provided upon its upper side with two upwardly-extending lugs or projections $a^5$, also provided with transversely-extending apertures. The shank $a^4$ of the part $a$ may be passed inwardly between the lugs or projections $a^5$ until the transversely-extending aperture therein is coincident with the apertures in said lugs or projections. A bolt $a^6$ may then be passed through said apertures to secure the parts $a$ $a'$ together. This bolt does not, however, clamp the parts; but they may turn upon such bolt relatively to each other. The lower portion of the part $a'$ is provided with an internal recess $a^7$. Opening through the side walls of said recess and opposite each other are apertures $a^8$.

The portion B of the hanger is composed of two parts $b$ $b'$, which parts are hinged together at one of their ends, as shown, by means of a bolt $b^2$ passing through them, and upon which they may turn. The upper portions of the parts $b b'$ are substantially straight, and when connected to the member A of the hanger are parallel, as shown more clearly in Fig. 1. Below such straight portions the parts $b$ $b'$ are curved, so that when the member B is secured to the member A a loop, as it were, is formed, in which a pipe may be received and supported.

In order to secure the member B to the member A, I provide the upper end portions of the parts $b$ $b'$ of the member B with inwardly-extending pins or projections $b^3$. These pins or projections are provided upon their under sides with downwardly-extending lugs $b^4$. The pins or projections $b^3$ are passed inwardly through the apertures $a^8$ and into the recess $a^7$ of the portion $a'$ of the member A, and are then dropped down, so that the lugs $b^4$ will engage the walls of the member $a'$ and prevent accidental lateral displacement of the member B, as shown more clearly in Fig. 1. The pins or projections $b^3$ thus constitute hooks by which the member B is secured upon the member A.

In order to inclose a pipe in the hanger the member B is slightly raised and the pins or projections $b^3$ withdrawn. The member B is then passed about the pipe and resecured in the manner described to the member A. The pins or projections $b^3$ act as pivots, upon which the member B may swing, and in the construction of my improvement shown in Figs. 1, 2, and 3, wherein the member A is composed of two portions pivoted together, motion may be had between the members horizontally in two directions at right angles to each other, for the reason that the member B is pivoted at right angles to the pivotal connection between the portions $a$ $a'$ of the member A. This admits of a free movement of the hanger in any desired direction in order to accommodate itself to the position of a pipe, or facilitate its being secured about a pipe or removed therefrom.

In the example of my improvement shown in Fig. 4 the portion $a$ of the member A is made integral with the portion $a'$, and there can be, therefore, no swinging movement between said portions.

What I claim as my invention, and desire to secure by Letters Patent, is—

The herein-described pipe-hanger, comprising an upper member and a lower member, the upper member consisting of two parts pivotally secured together, the lower part of the upper member being provided near its lower end with an interior recess and openings from two opposite sides of the part into the recess, and the lower member consisting of two arms hinged together at their lower ends and at their upper ends provided with projections extending laterally thereto and adapted to enter the openings in the opposite sides of the lower part of the upper member, said projections being provided with downwardly-projected lips or lugs at their ends adapted to engage the inner wall of the said lower part of the upper member, the said projections on the lower member and the pivotal connection between the parts of the upper member extending transversely to each other, and thereby admitting a swinging movement of the lower member in the direction of the line of pipe and a swinging movement of the lower member in the lower part of the upper member in a direction transverse to the line of pipe, substantially as set forth.

ENOCH RUTZLER.

Witnesses:
FREDK. HAYNES,
GEORGE BARRY.